Patented July 31, 1928.

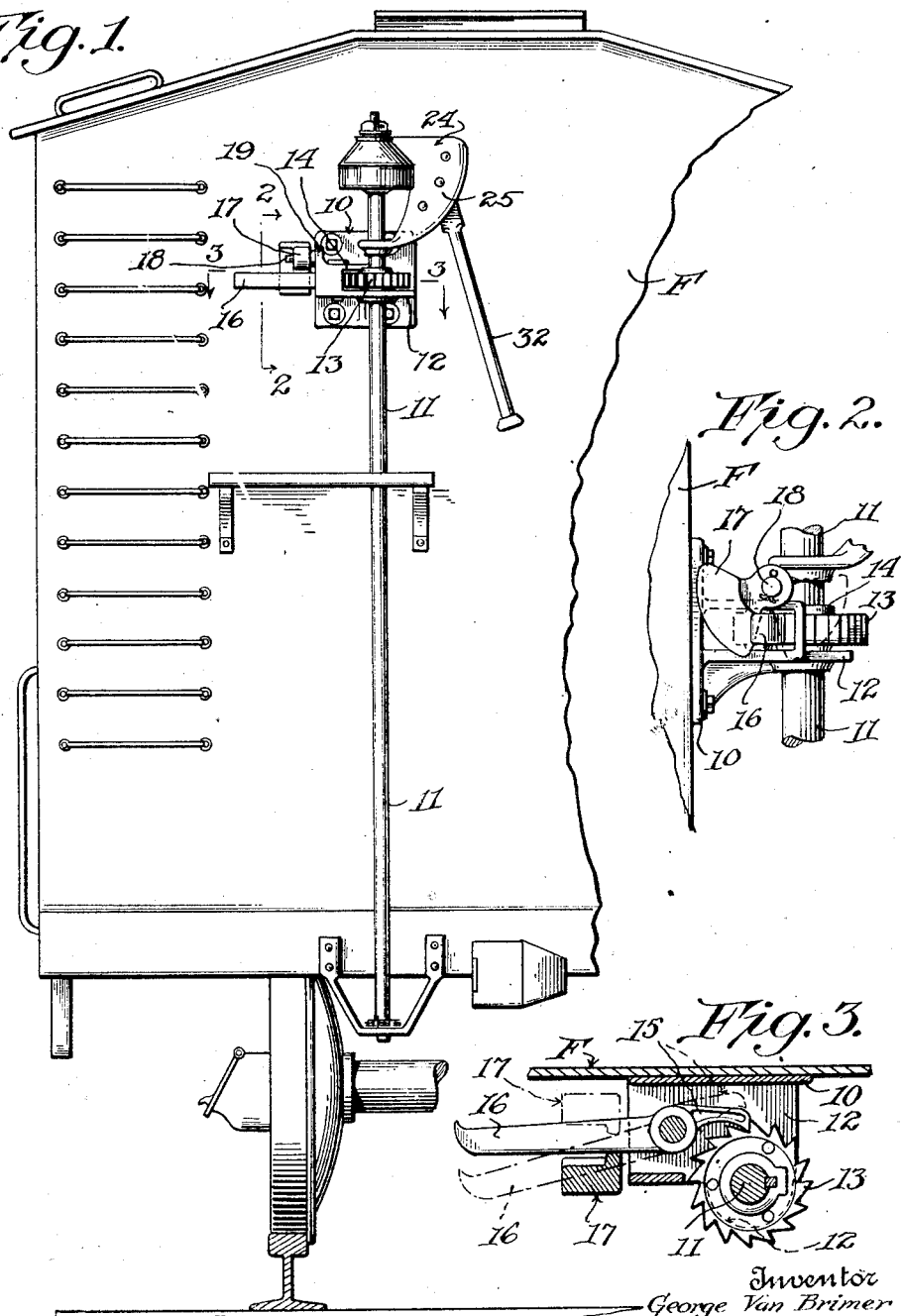

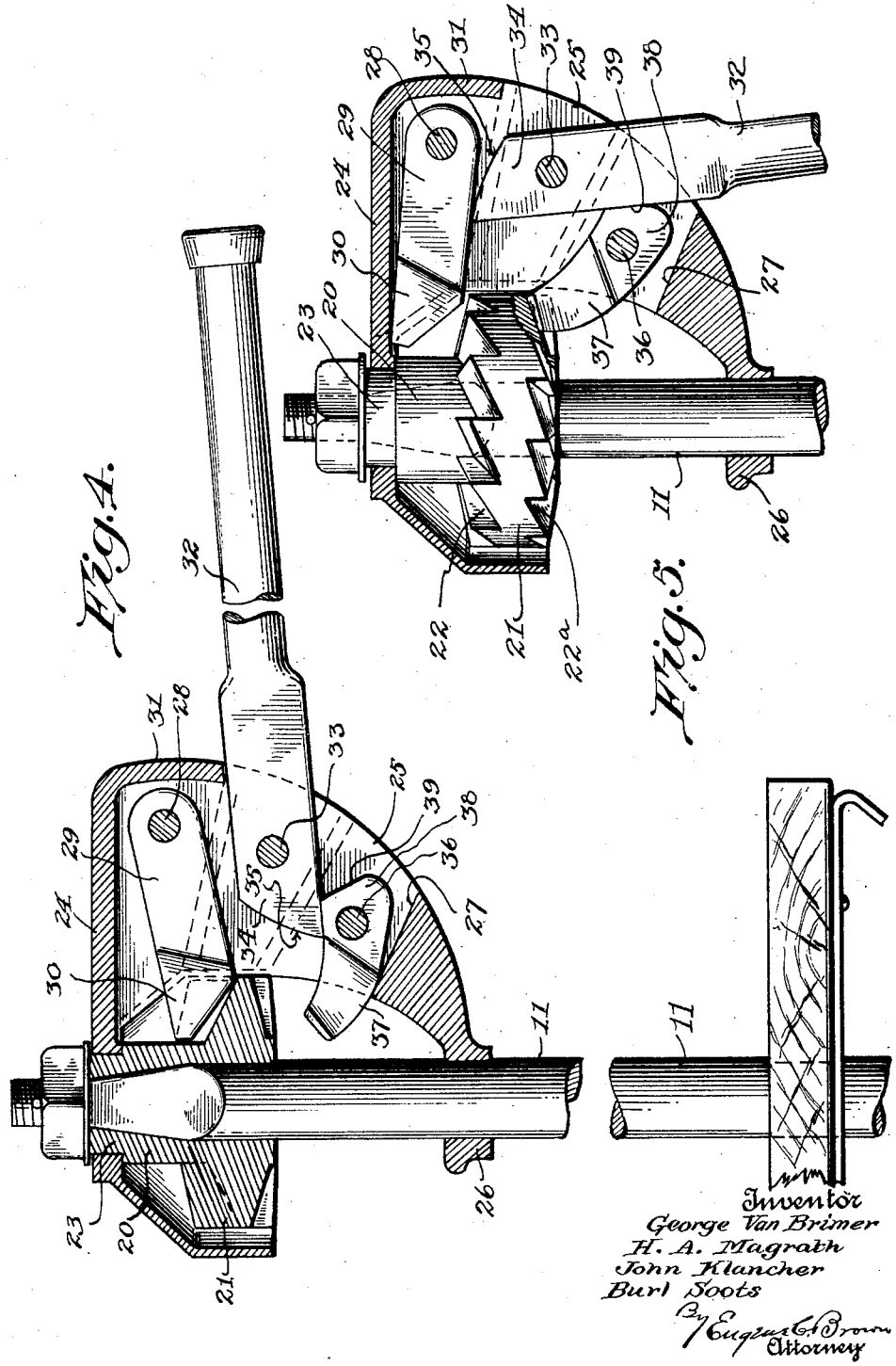

1,679,281

UNITED STATES PATENT OFFICE.

GEORGE VAN BRIMER, HOMER A. MAGRATH, JOHN KLANCHER, AND BURL SOOTS, OF PUEBLO, COLORADO.

SAFETY REVERSE RATCHET BRAKE.

Application filed January 23, 1926. Serial No. 83,333.

This invention relates to manually controlled brake operating mechanism for railway cars and is especially intended for use on freight cars.

More particularly the invention relates to improvements in the safety reverse ratchet brake shown and described in our prior Patent No. 1,503,139, dated July 29, 1924.

Among the principal objects of the present invention are the improvement and simplification of the manner in which the winding and unwinding pawls are controlled by the hand lever; and the improvement and simplification of the means by which the pawl of the locking ratchet is controlled.

In the following description we shall refer to the accompanying drawings in which:—

Figure 1 is an elevation of a portion of the end of a freight car showing our ratchet brake applied thereto.

Figure 2 is an enlarged view of the locking ratchet mechanism taken in the direction of the arrows on the line 2—2 of Figure 1.

Figure 3 is a section on the line 3—3 of Figure 1, the view being drawn to the same scale as Figure 2.

Figure 4 is an enlarged detail section through the head of the device showing the hand lever raised.

Figure 5 is a view similar to Figure 4 showing the hand lever dropped.

In the present embodiment of the invention there is shown a portion F of the end wall of a freight car of the ordinary box car type. Near the top of this wall there is mounted a bracket 10 located to one side of the center of the car so that the ordinary brake staff 11 may extend vertically through the projecting flange 12 formed on the bracket and not interfere with the coupler. The lower end of this staff is connected in the usual manner to the car brakes but this connection has not been illustrated in the drawings as it forms no part of the present invention.

Just above the flange 12 there is fixed on the staff 11 an edge ratchet 13 and pivoted between the flange 12 and a second flange 14, spaced above said flange 12, is a pawl having one end 15 engageable with the ratchet and its remaining end 16 projecting laterally into the path of a trip 17. This trip is pivoted on a pin 18 projecting from an extension 19 extending upwardly from the flange 14. This trip has a form substantially like that of the sector of a circle so as to present two substantially radial faces and is of sufficiently heavy construction that, when in the full line position of Figure 2 (dotted in Figure 3) it will move the end 15 out of engagement with the ratchet 13 while, as shown in dotted lines in Figure 2 (full in Figure 3) it will, when reversed, act to hold the end 15 yieldably against said ratchet. Thus by simply flipping the trip to one side or the other of the pawl end 16 the pawl may be engaged or disengaged from the ratchet. It will be obvious that this construction avoids the use of the pair of arms and weight of our prior patent and, due to its ruggedness, is much less liable to breakage, and is simpler to manufacture.

The staff actuating mechanism is carried by the upper end of the staff and comprises a hub 20, fixed on the upper end of the staff and having a flange 21 provided with upper and lower face ratchets 22 and 22ª arranged in opposite directions, the upper ratchet 22 being the brake setting ratchet and the lower ratchet 22ª forming the brake unwinding ratchet. At its upper end the hub is provided with a journal 23 whereon is mounted a bracket 24 having downwardly extending spaced arms 25 united at their lower ends to form a bearing 26 mounted on the staff 11. The connection between the lower ends of these arms forms a stop surface 27. A pivot 28 extends between these arms 25 at their upper parts and mounted on this pivot is a pawl 29 having a weighted end 30 engageable with the ratchet 22. This pawl 29 is housed beneath the bracket 24, being protected from the weather by a downwardly depending flange 31 which has a lower edge forming a limit stop for the upwardly swinging movement of a hand lever 32 mounted on a pivot 33 extending between the arms 25. The lever 32 has a short end 34 terminating in a cam surface 35 engageable with the under side of the pawl 29 upon depression of the handle end of the lever, as clearly shown in Figure 5, to lift the pawl out of contact with the ratchet 22. Thus raising the handle of the lever 32 to its upward limit allows engagement of the pawl 29 while dropping the handle and disengages the pawl 29 and it will be noted that this action is very different from our former patent wherein the handle had to be held in an intermediate position to permit engagement of the corresponding pawl and in which either limit of movement of the handle would serve to disengage such pawl.

Adjacent the surface 27 a pivot 36 extends between the arms 25 and on this pivot is mounted a pawl 37 positioned, when raised, to engage the ratchet 22ª. This pawl has a short end 38 provided with a cam surface 39 engageable by a coacting surface of the under side of the lever 32. The arrangement of these parts is such that dropping the handle (as in Figure 5) throws the pawl into engagement with the ratchet 22ª, the handle thus acting as a weight to hold the pawl yieldably in such engagement. Obviously lifting the handle as in Figure 4 permits the pawl to drop on the surface 27 but if the pawl jams the short end 34 will force it downwardly.

The operation is simple. In setting the brakes the handle is raised and oscillated in a horizontal plane, the trip being set to effect operation of the locking pawl 15. The handle may then be dropped but, unless the trip is thrown to release pawl 15 the brakes will remain set. To release the brakes the trip is thrown over. Ordinarily this will be sufficient, but if the brakes do not fully release, the handle may be grasped and oscillated in its lowered position, causing the pawl 37 to engage the lower ratchet 22ª. This will effect a positive release rotation of the staff 11.

While we have here shown one form of the device changes which fall within the scope of the invention will be apparent to engineers and those skilled in the art so that the scope of the invention is not to be restricted by the particular form shown but is to be sufficient to include all forms covered by the appended claims.

Having thus described the invention, what is claimed as new, is:

1. In a mechanism for the purpose described, a rotatable shaft, a bracket rotatably mounted on said shaft, right hand and left hand ratchets fixed on the shaft, a pawl pivoted to said bracket and movable into and out of engagement with the first ratchet, a second pawl also pivoted to the bracket and movable into and out of engagement with the second ratchet, and a lever pivoted between said pawls on said bracket to swing in a plane radially of the shaft, said lever having a short end which, in its lowered position, engages the under side of the first said pawl forward of its pivot to lift it out of engagement with the ratchet and bears laterally against the second pawl rearward of its pivot to swing it up into engagement with the ratchet, and said lever, when swung into its uppermost position, disengages both pawls, whereby the first pawl drops into engagement with its ratchet and the second pawl drops away from its ratchet.

2. In a mechanism for the purpose described, a rotatable shaft, a bracket rotatably mounted on said shaft, a ratchet member mounted on said shaft and having a right hand and a left hand ratchet, a pair of pawls mounted on the bracket to cooperate with the respective ratchets, and an operating lever swingingly mounted on the bracket and normally resting in depending position, said lever having a short end which, in its depending position, engages the under side of the first said pawl forward of its pivot to lift it out of engagement with the ratchet and bears laterally against the second pawl rearward of its pivot to swing it up into engagement with the ratchet, and said lever, when swung outwardly into its uppermost position, disengages both pawls, whereby the first pawl drops into engagement with its ratchet and the second pawl drops away from its ratchet.

3. In a mechanism for the purpose described, a rotatable shaft, a winding ratchet on said shaft, an unwinding ratchet on said shaft, a bracket embracing said ratchets and rotatable on the shaft, a pawl pivoted at one end to the bracket and positioned for gravitational engagement with the winding ratchet, an operating lever pivoted to the bracket to swing between depending and raised position, said lever being pivoted adjacent one of its ends to provide a short end adapted to engage said pawl and free it from the ratchet when the lever is in depending position, said lever when raised to its upper limit releasing said pawl whereby it drops to engage the winding ratchet, and a second pawl pivoted to the bracket at its lower part and intermediate its ends to provide a long arm movable into and out of engagement with the unwinding ratchet and a short arm projecting in the path of the longer arm of the lever to cause the second pawl to engage the unwinding ratchet when the lever is in its depending position, the longer arm of the second pawl being engaged by the short arm of the lever when the long arm of the lever is raised into its upper position and being thereby held out of engagement with the unwinding ratchet.

In testimony whereof, we affix our signatures.

GEO. VAN BRIMER.
HOMER A. MAGRATH.
JOHN KLANCHER.
BURL SOOTS.